(12) United States Patent
Kokudo

(10) Patent No.: US 7,039,021 B1
(45) Date of Patent: May 2, 2006

(54) AUTHENTICATION METHOD AND APPARATUS FOR A WIRELESS LAN SYSTEM

(75) Inventor: Junichi Kokudo, Tokyo (JP)

(73) Assignee: NEC Corporation, Tokyo (JP)

( * ) Notice: Subject to any disclaimer, the term of this patent is extended or adjusted under 35 U.S.C. 154(b) by 615 days.

(21) Appl. No.: 09/680,258

(22) Filed: Oct. 5, 2000

(30) Foreign Application Priority Data

Oct. 5, 1999 (JP) .................................. 11-284231

(51) Int. Cl.
H04B 7/00 (2006.01)
(52) U.S. Cl. ........................................ 370/310; 455/411
(58) Field of Classification Search ................ 370/310, 370/338, 349, 389, 469, 475, 522; 379/91.01, 379/93.02, 93.03, 142.05, 142.06; 713/150, 713/151, 152, 153, 155, 158, 168; 380/247, 380/248, 249, 277, 278; 455/431.1, 411, 455/410, 432; 340/825.34
See application file for complete search history.

(56) References Cited

U.S. PATENT DOCUMENTS

| | | | | |
|---|---|---|---|---|
| 5,586,260 A | * | 12/1996 | Hu | 713/201 |
| 5,673,318 A | * | 9/1997 | Bellare et al. | 713/170 |
| 5,796,727 A | * | 8/1998 | Harrison et al. | 370/338 |
| 6,052,785 A | * | 4/2000 | Lin et al. | 713/201 |
| 6,148,405 A | * | 11/2000 | Liao et al. | 713/201 |
| 6,272,148 B1 | * | 8/2001 | Takagi et al. | 370/469 |
| 6,307,837 B1 | * | 10/2001 | Ichikawa et al. | 370/230 |
| 6,332,077 B1 | * | 12/2001 | Wu et al. | 455/432.1 |
| 6,345,043 B1 | * | 2/2002 | Hsu | 370/324 |
| 6,400,722 B1 | * | 6/2002 | Chuah et al. | 370/401 |
| 6,453,159 B1 | * | 9/2002 | Lewis | 455/411 |
| 6,526,506 B1 | * | 2/2003 | Lewis | 713/153 |
| 6,574,466 B1 | * | 6/2003 | Papini et al. | 455/410 |
| 6,600,734 B1 | * | 7/2003 | Gernert et al. | 370/352 |
| 6,606,663 B1 | * | 8/2003 | Liao et al. | 709/229 |
| 6,636,894 B1 | * | 10/2003 | Short et al. | 709/225 |
| 6,701,361 B1 | * | 3/2004 | Meier | 709/224 |
| 6,801,941 B1 | * | 10/2004 | Stephens et al. | 709/225 |

FOREIGN PATENT DOCUMENTS

| | | |
|---|---|---|
| JP | 11-252183 | 9/1999 |
| JP | 11-265349 | 9/1999 |

OTHER PUBLICATIONS

*5 GHz Band Ethernet Type Wireless LAN System*, NTT R&D, vol. 48, pp. 15-21, dated Aug. 10, 1999.

* cited by examiner

*Primary Examiner*—Hanh Nguyen
*Assistant Examiner*—Dmitry Levitan
(74) *Attorney, Agent, or Firm*—Sughrue Mion, PLLC

(57) ABSTRACT

An authentication method and apparatus at a wireless LAN (local area network) system based on the IEEE 802.11, in which many STAs (terminal stations) are connected to APs (access points), and which can keep the security in authentication, is provided. At the authentication method, an authentication request from one of the STAs composed of a data terminal and a wireless LAN card is transmitted to one of the APs. The AP transmits a MAC (media access control) address of the STA to an authentication server by converting the authentication request to a protocol adaptable to the authentication server. The authentication server checks the MAC address and transmits a challenge message to the AP 2. The AP 2 executes encryption authentication with the STA based on a WEP (wired equivalent privacy) algorithm stipulated in the IEEE 802.11.

10 Claims, 6 Drawing Sheets

AUTHENTICATION METHOD AND APPARATUS FOR A WIRELESS LAN SYSTEM

BACKGROUND OF THE INVENTION

The present invention relates to an authentication method and apparatus at a wireless LAN (local area network) system, in particular, based on the IEEE (Institute of Electrical and Electronics Engineers) 802.11.

DESCRIPTION OF THE RELATED ART

A wireless LAN system based on the IEEE 802.11 has been developed. In the system, frequency bands such as 2.4 GHz or 5 GHz can be used without license, therefore, it is important to keep security at the wireless network.

At the chapter 8, Authentication and Privacy, in the IEEE 802.11, Open system authentication method and Shared key authentication method used WEP (wired equivalent privacy) algorithm are stipulated, and either one of the Authentication methods is fixed and used in a wireless LAN system.

FIG. 1 is a block diagram showing a conventional structure of a wireless LAN system based on the IEEE 802.11. In FIG. 1, a STA 1 is a terminal station and the plural STAs 1 are provided in the wireless LAN system, and each STA 1 is a data terminal having transmitting and receiving functions for radio signals, such as a notebook size PC (personal computer).

And an AP (access point) 2 has an interface function between a wireless network and a wired network, and also has transmitting and receiving functions for radio signals, and further provides firmware for controlling the radio signals and a MAC (medium access control) address authentication function. And plural APs 2 are also provided in the wireless LAN system. A maintenance server 4 sets and controls the plural APs 2 by a SNMP (simple network management protocol).

The connection between the STAs 1 and the APs 2 is a wireless network 5, and the connection between the APs 2 and the maintenance server 4 is a wired network such as Ethernet.

First, referring to a drawing, the shared key authentication method is explained. FIG. 2 is a sequence diagram showing a conventional procedure of encryption authentication used the WEP algorithm stipulated in the IEEE 802.11. In FIG. 2, the encryption authentication used the WEP algorithm is executed in a MAC (media access control) being a sub-layer of a data link layer that is the second layer of an OSI (open system interconnection).

The MAC controls access rights when data transmission requests from plural terminal stations compete with one another on a common transmission line, and distinguishes physical connecting points between the terminal stations and the transmission line, and forms frames, and executes error control on the transmission line, together with a physical layer being the first layer of the OSI.

First, an authentication request is transmitted from a STA 1 to an AP 2 by a radio signal (S1). At this time, bits showing the authentication request based on the shared key authentication method are provided in a PDU (packet data unit) format. And a MAC address of the STA 1 is included in a MAC frame as a source address.

Next, a challenge text is transmitted from the AP 2, which is received the authentication request, to the STA 1 (S2). The STA 1 encrypts the received challenge text by using the own shared key and an IV (initialization vector) based on the WEP algorithm (S3).

And the STA 1 transmits the encrypted challenge text and the IV to the AP 2 (S4). The AP 2 decrypts the received encrypted challenge text by using the received encrypted challenge text, the IV, and the own shared key. And the AP 2 compares the challenge text transmitted at the S2 with the decrypted challenge text obtained at the S4, and judges whether the two challenge texts are the same or not (S5).

When the judged result is the same, the AP 2 transmits a successful code as an authentication completed notice to the STA 1, because the authentication has completed (S6). The STA 1 received the authentication completed notice transfers to association operation with the AP 2 (S7).

At the open system authentication method, when the STA 1 transmits an authentication request to the AP 2, any special judging procedure is not executed, and an authentication result is transmitted from the AP 2 to the STA 1. This is a simple procedure.

However, at the conventional wireless LAN system based on the IEEE 802.11, the authentication method and apparatus have the following problems.

First, at the conventional wireless LAN system mentioned above, the AP 2 authenticates the MAC address. However, generally the main task of the AP 2 is an interface function between the wireless network and the wired network, therefore there is a limit in hardware and software to execute the authentication function of the MAC address. Especially, it is difficult for the generally used AP 2 to provide a MAC address table of many STAs 1, for example, more than 10000 STAs 1. Consequently, authenticating the MAC addresses for the many STAs 1 becomes difficult.

Second, a card such as a PC card, in which hardware and firmware for controlling radio signals and an ID (identifier) are memorized, has been recently used in each terminal station in the wireless LAN system. In order to apply the shared key authentication method stipulated in the IEEE 802.11 to this kind wireless LAN system, the shared key is also memorized in the card. In this case, the card is small and easy to carry, and forgetting to leave the key or stolen the key will happen, therefore the probability that the key is used illegally becomes large, and a method to keep the security is required.

Thirdly, after the authentication procedure is completed at the open system authentication method, the communication period after the association has no limitation, consequently, there is a possibility to be connected illegally, and the security becomes low.

SUMMARY OF THE INVENTION

It is therefore an object of the present invention to provide an authentication method and apparatus at a wireless LAN system, which can keep the security.

According to the present invention, for achieving the object mentioned above, there is provided an authentication method at a wireless LAN (local area network) system. The authentication method provides the steps of; transmitting an authentication request from a STA (terminal station) to an AP (access point), with which the STA desires to make association, requesting authentication of the authentication request from the AP to an authentication server, by converting the authentication request to a protocol adaptable to the authentication server, cheking the authentication request at the authentication server based on a MAC (media access control) address of the STA, executing encryption authentication at the AP with the STA based on a designated encryption algorithm, and notifying an authentication completion from the authentication server to the AP, after the authentication server received a response of a completion of the encryption authentication from the AP.

According to the present invention, after the encryption authentication is normally completed, a table of the MAC address in the AP is renewed by an instruction from the authentication server.

According to the present invention, in case that a trouble occurs at the authentication server, the AP itself executes authentication of the MAC address.

According to the present invention, the encryption algorithm uses a shared key having a predetermined usable period.

According to the present invention, in case that the predetermined usable period of the shared key expired, the MAC address is authenticated by an open system authentication method, and at the open system authentication method, after association, a period of communication is limited to a designated short time, and a key is transported in the limited time by using such an Internet Key Exchange method of Public Key Infrastructure, and the authentication request is executed again by using the shared key.

According to the present invention, the authentication algorithm is a WEP (wired equivalent privacy) algorithm stipulated in the IEEE 802.11.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 3:
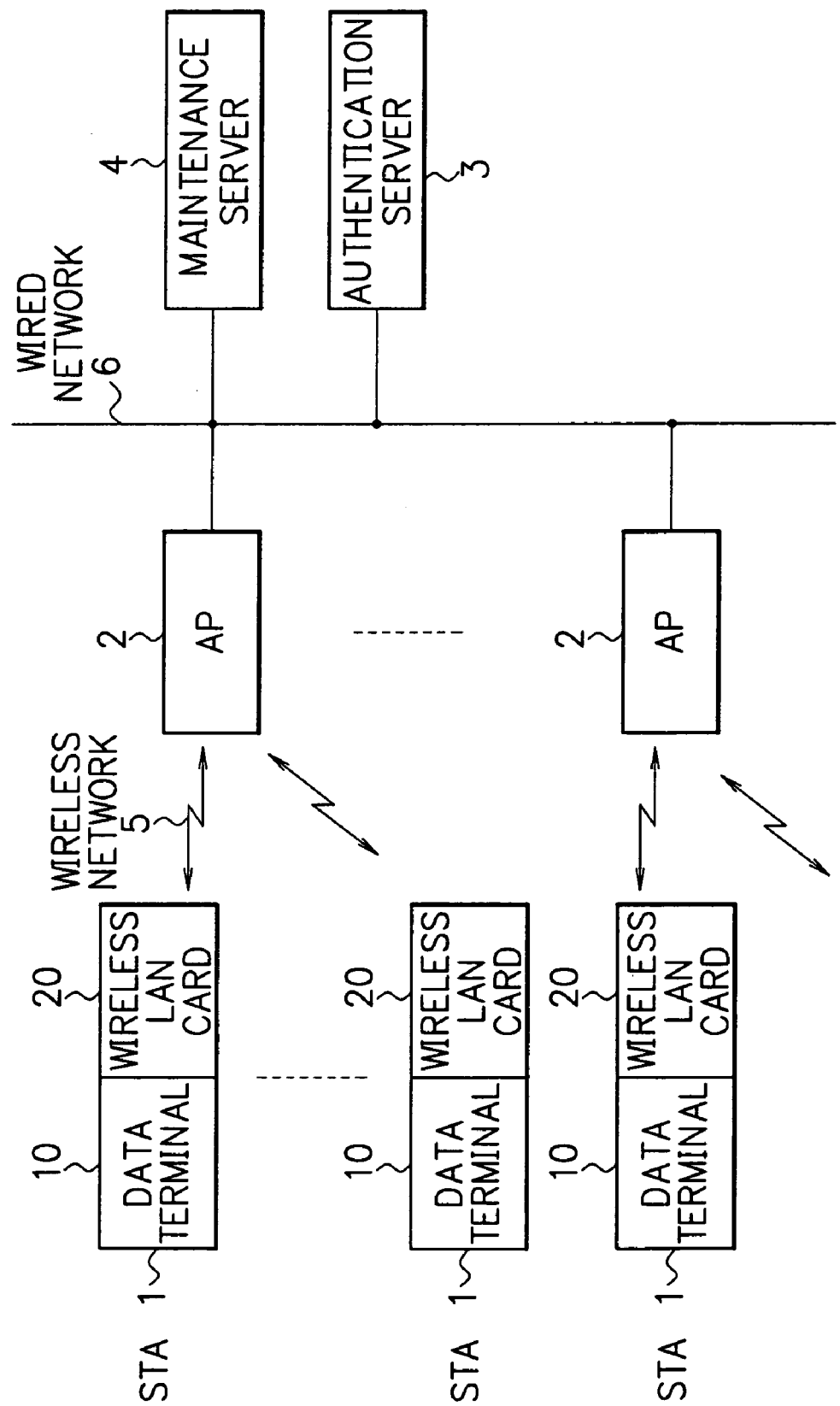
FIG. 3 is block diagram showing a system structure of an embodiment of an authentication apparatus of a wireless LAN system of the present invention.

Referring now to the drawings, embodiments of the present invention are explained in detail. FIG. 3 is block diagram showing a system structure of an embodiment of an authentication apparatus of a wireless LAN system of the present invention. In FIG. 3, a STA 1 is a terminal station and the plural STAs 1 are provided in the authentication apparatus of the wireless LAN system of the present invention. Each STA 1 consists of a data terminal 10 such as a notebook size PC, and a wireless LAN card 20 in which hardware and firmware for transmitting and receiving radio signals and for controlling the radio signals are provided.

And an AP 2 has an interface function between a wireless network and a wired network, and also provides hardware and firmware for transmitting and receiving radio signals and for controlling the radio signals. And the AP 2 also provides a function for converting protocols so that the authentication protocol of the IEEE 802.11 and the protocol to authenticate the STA 1 are made to be adaptable to the authentication protocol of an authentication server. The plural APs 2 are also provided in the authentication apparatus of the wireless LAN system of the present invention.

An authentication server 3 is a server having an authentication function, and usable MAC addresses of the STAs 1 are registered in the authentication server 3 beforehand. At the embodiment of the present invention, a RADIUS (remote authentication dial in user service) server having functions such as access for dialing up, authentication, and charging is used. However, the authentication server 3 is not limited to the RADIUS server. And the authentication server 3 also has a function for executing the MAC address authentication by connecting to the APs 2.

A maintenance server 4 is a server to set and control the APs 2 by the SNMP.

At the embodiment of the present invention, the authentication server 3 and the maintenance server 4 are separated and independent, however, both functions can be installed in one server.

The connection between the STAs 1 and the APs 2 is a wireless network 5, and the connection between the APs 2 and the authentication server 3, and between the APs 2 and the maintenance server 4 is a wired network 6 such as Ethernet.

Figure 4:
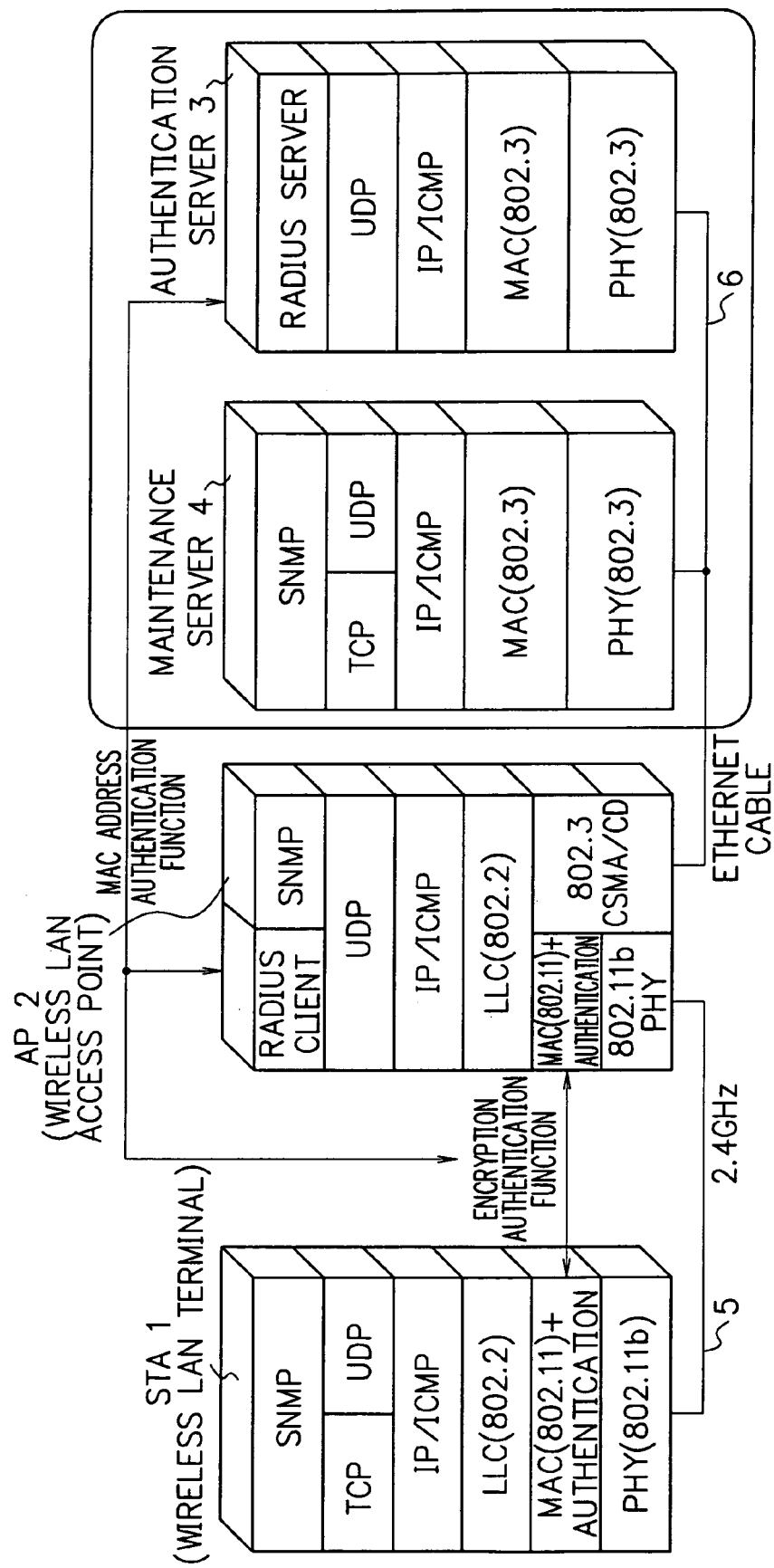
FIG. 4 is a diagram showing a protocol stack at each node of a control plane of the embodiment of the authentication apparatus of the wireless LAN system of the present invention.

FIG. 4 is a diagram showing a protocol stack at each node of a control plane of the embodiment of the authentication apparatus of the wireless LAN system of the present invention.

In FIG. 4, at the IEEE 802.11, the association and the authentication are handled as entities in the MAC being the sub layer of the data link layer. In the wireless network 5, encryption authentication is executed based on the IEEE 802.11. When the AP 2 receives an authentication request from the wireless network 5, the AP 2 transfers the authentication request to the authentication server 3. The authentication server 3 executes authentication operation by using the RADIUS protocol.

Figure 5:
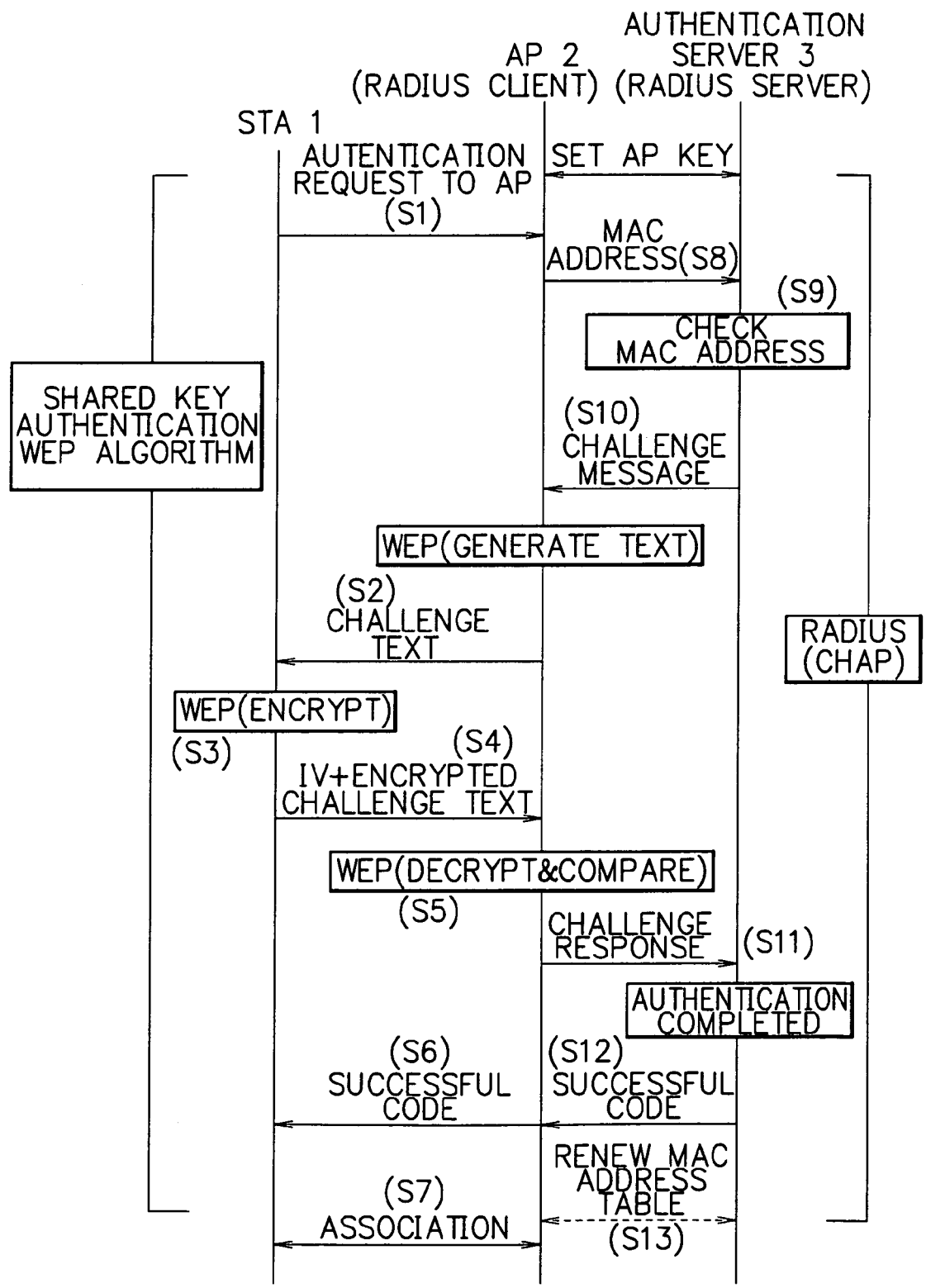
FIG. 5 is a sequence diagram showing an authentication procedure of a first embodiment of an authentication method of the wireless LAN system of the present invention.

FIG. 5 is a sequence diagram showing an authentication procedure of a first embodiment of an authentication method of the wireless LAN system of the present invention. At the embodiment of the present invention, in addition to the encryption authentication used the shared key authentication method utilized the WEP algorithm stipulated in the IEEE 802.11, an authentication used the MAC address is executed.

Keys of the STAs 1 and the APs 2 are set beforehand, and usable MAC addresses of the STAs 1 are registered in the authentication server 3 beforehand.

As explained in FIG. 3, at the embodiment of the authentication apparatus of the wireless LAN system of the present invention, the wireless LAN card 20 is provided in the STA 1, consequently, there is a possibility that the wireless LAN card is forgotten to leave, or the card is stolen by an illegal user and used. Therefore, in order to keep the security in a high level, the authentication used the MAC address is combined with the shared key authentication method to determine which cards are stolen. In FIG. 5, a procedure that is the same procedure in FIG. 2 has the same reference number.

Referring to FIG. 5, operation of the embodiment of the authentication apparatus of the wireless LAN system of the present invention is explained. First, an authentication request is transmitted from a STA 1 to an AP 2 by a radio signal (S1). At this time, bits showing the authentication request based on the shared key authentication method are provided in the PDU format. And a MAC address of the STA 1 is included in a MAC frame as a source address.

Figure 1:
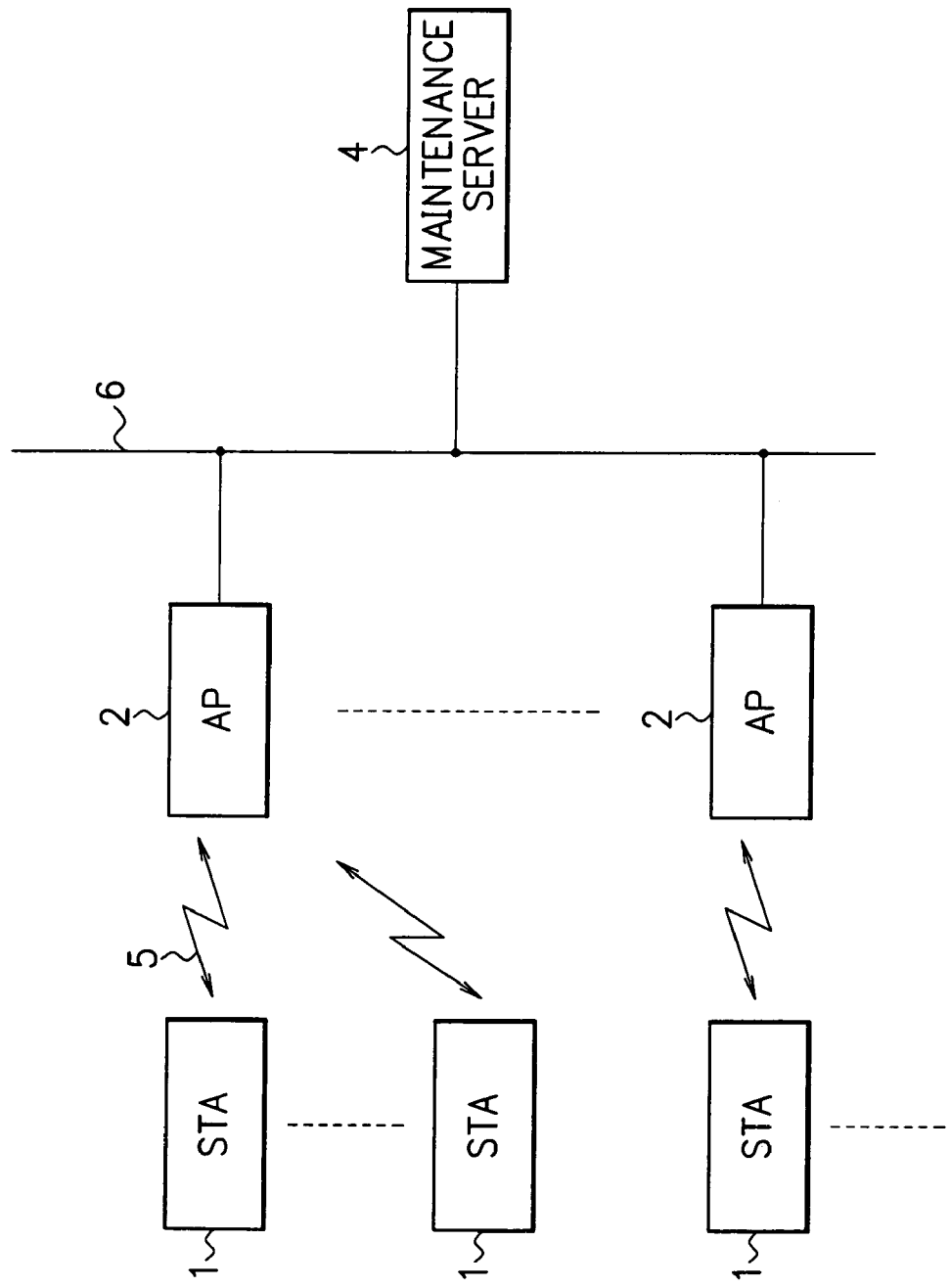
FIG. 1 is a block diagram showing a conventional structure of a wireless LAN system based on the IEEE 802.11.
Figure 2:
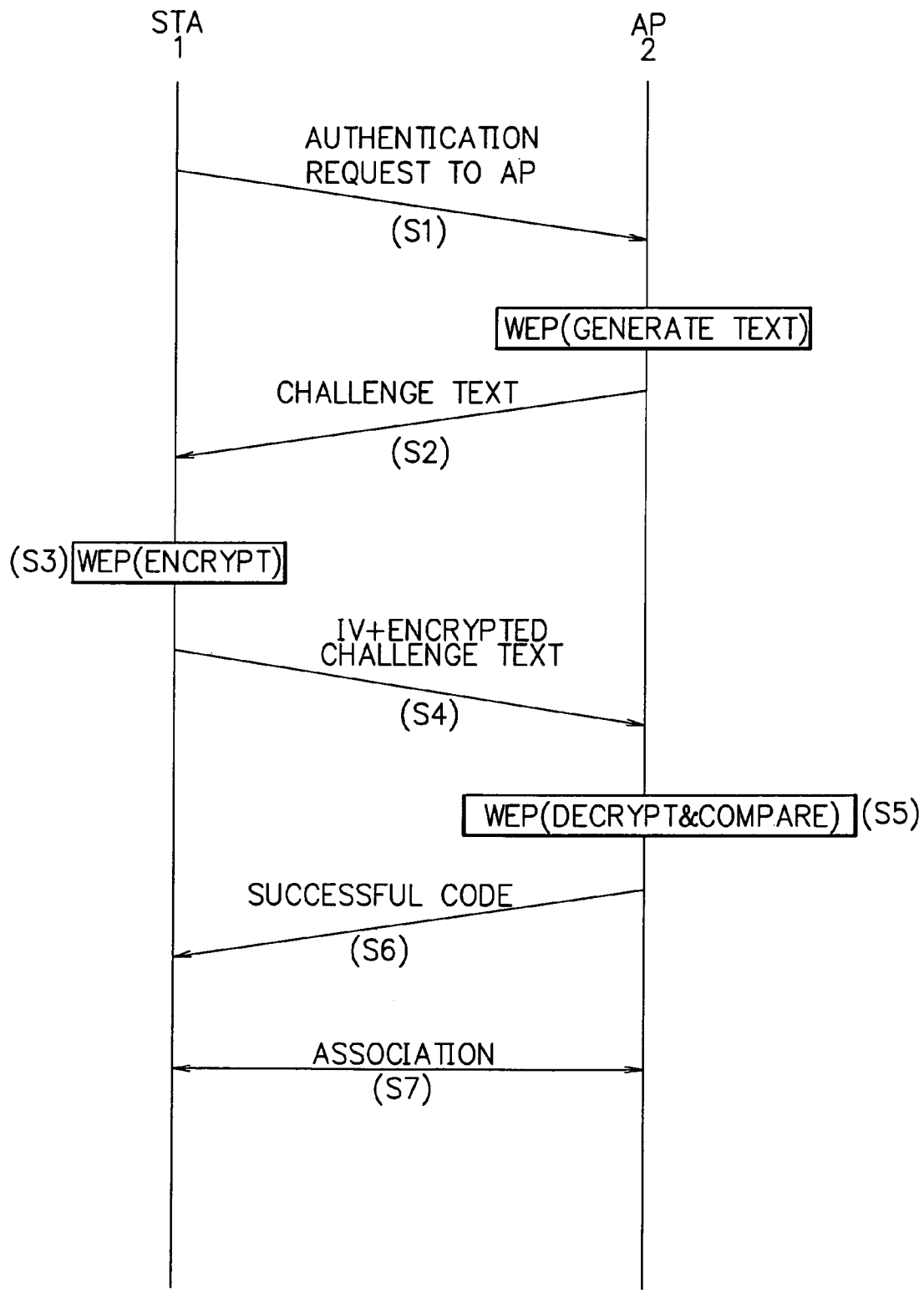
FIG. 2 is a sequence diagram showing a conventional procedure of encryption authentication used the WEP algorithm stipulated in the IEEE 802.11.

At the conventional WEP algorithm shown in FIG. 2, the AP 2 received the authentication request provides a challenge text and transmits the challenge text to the STA 1. However, at the first embodiment of the present invention, the AP 2 requests a check to the authentication server 3 by using the MAC address as the ID (identifier) (S8).

In this, the authentication server 3 is a RADIUS server, and operates based on the RADIUS protocol defined by the RFC (request for comments) 2138 of the IETF (Internet engineering task force).

And the MAC address is defined as a user name or a calling-station ID on the authentication protocol (RADIUS protocol).

The authentication server (RADIUS server) 3 checks the MAC address received from the AP 2 (S9).

In case that the MAC address is checked and confirmed, a challenge message is transmitted to the AP 2, base on a procedure being equivalent to the CHAP (PPP challenge handshake authentication protocol) defined at the RFC 1994 of the IETF (S10). In this, the PPP signifies a point-to-point protocol.

At the CHAP, a message digest 5 (MD 5) is defined as a hashing method being one way. However, instead of the MD 5, one of the other hashing methods can be used.

The AP 2 received the challenge message from the authentication server 3 transmits a challenge text to the STA 1 based on the normal WEP algorithm (S2). As the challenge text, the challenge message transmitted from the authentication server 3 can be used as it is, instead of the challenge text based on the WEP algorithm.

The STA 1 encrypts the challenge text received from the AP 2 by using the own shared key and an IV based on the WEP algorithm (S3).

And the STA 1 transmits the encrypted challenge text and the IV to the AP 2 (S4). The AP 2 decrypts the received encrypted challenge text by using the received encrypted challenge text, the IV, and the own shared key. And the AP 2 compares the challenge text transmitted at the S2 with the decrypted challenge text obtained at the S4, and judges whether the two challenge texts are the same or not, and when the judged result is the same, the authentication at the wireless network is success (S5).

The AP 2 returns a CHAP response (challenge response) to the authentication server 3 by hashing of the CHAP (S11).

When the authentication server 3 acknowledges that a normal response is received by using the CHAP, the authentication server 3 notifies the completion of the authentication (successful code) to the AP 2 by judging that the total authentication is completed (S12).

The AP 2, received the authentication completion notification (successful code), notifies the authentication completion to the STA 1, and the STA 1 also recognizes that the authentication is successful (S6).

The authentication server 3 instructs that the usable MAC address table stored in the AP 2 is made to renew (S13). As a result, a newly authenticated MAC address is registered at any time, and the MAC address table in the AP 2 can be automatically renewed. After this operation, the STA 1 and the AP 2 go to association operation (S7).

As a result of the first embodiment, the following effect can be also realized. At the first embodiment of the present invention, as shown in FIG. 5, the AP 2 executes the authentication request to the authentication server 3 by using the MAC address as the ID (S8). However, when a trouble occurs at the hardware or the software in the authentication server 3 and the authentication server 3 can not receive the authentication request from the AP 2, at that time, the AP 2 itself can execute the authentication by using the MAC address.

As mentioned at the S 13 in FIG. 5, the MAC address table in the AP 2 is automatically renewed, therefore the authenticated result is taken in the MAC address table in the AP 2 immediately. The AP 2 stores the MAC addresses until that the trouble occurs at the authentication server 3, therefore the AP 2 can authenticate the MAC addresses by itself. Consequently, even when some troubles occur at the authentication server 3, the authentication procedure can be continued.

At a second embodiment of the present invention, the usable time of the shared key is limited to a designated period beforehand at a key control server (not shown), therefore the security is made to be high. As shown in FIG. 5, at the S3 of the first embodiment, the STA 1 can always encrypt the challenge text received from the AP 2 by using the own shared key and the IV based on the WEP algorithm. At the second embodiment, in order that the illegal authentication is not executed even when the shared key is leaked, a security can be kept by limiting the usable time of the shared key.

Next, a third embodiment of the present invention is explained. At the second embodiment of the present invention, the usable time of the shared key for the WEP is limited, with this, the security against the illegal usage can be kept. However, when a legal user did not use the STA 1 within the usable limit time, the key must be transported in case that the legal user uses after the usable time limit.

At the third embodiment, an authentication method, at the time when the shared key becomes invalid due to the usable time limit, is explained.

Figure 6:
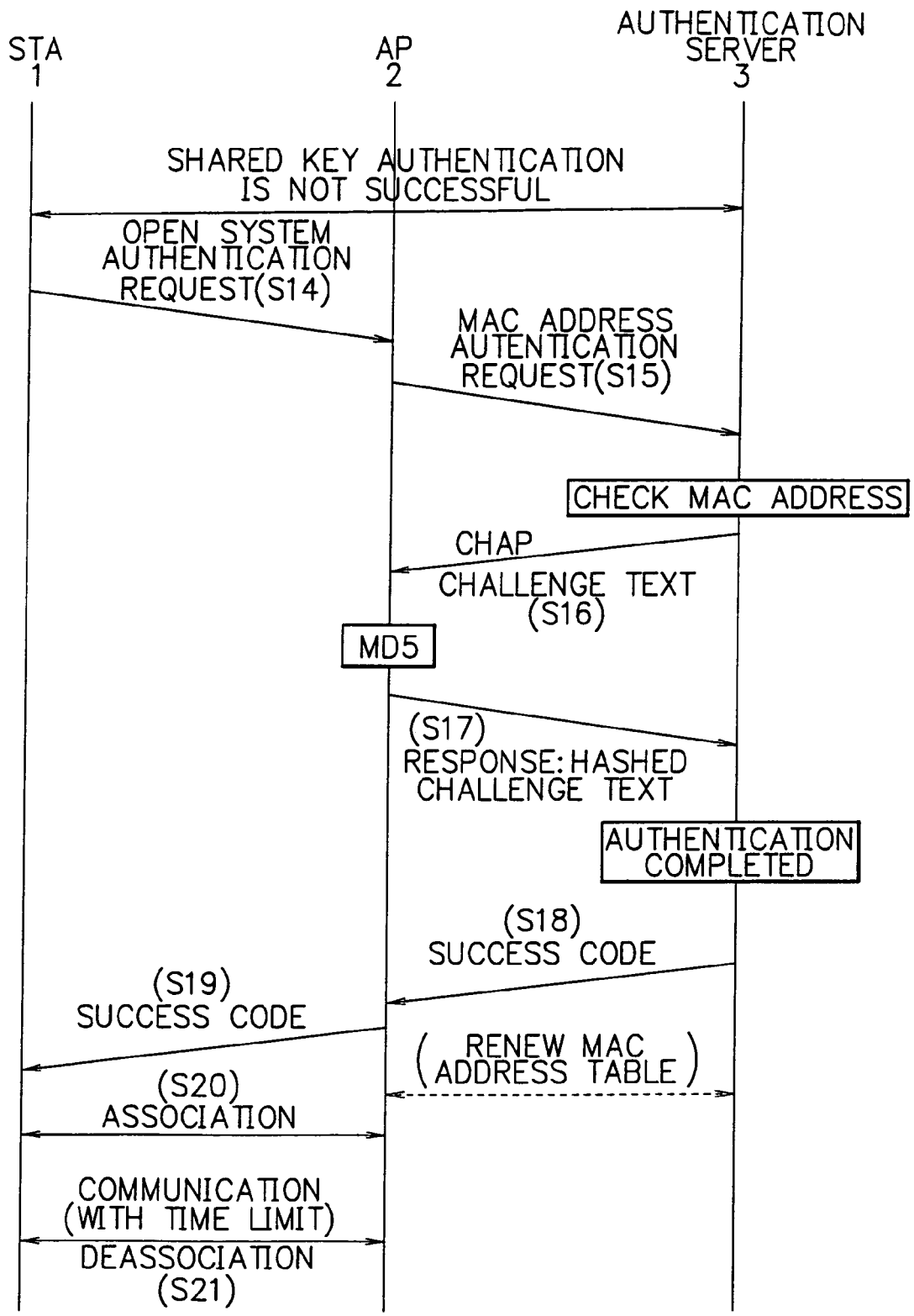
FIG. 6 is a sequence diagram showing an authentication procedure of a third embodiment of the authentication method of the wireless LAN system of the present invention.

FIG. 6 is a sequence diagram showing an authentication procedure of the third embodiment of the authentication method of the wireless LAN system of the present invention.

In FIG. 6, when the shared key from the STA 1 becomes invalid (unsuccessful), the STA 1 requests again the authentication for the AP 2 by the open system authentication method (S14).

The AP 2 recognizes that the request is executed by the open system authentication method, and requests the authentication for the authentication server 3 by using the MAC address as the authentication ID (S15).

In this, the authentication server 3, for example, operates based on the RADIUS protocol defined at the RFC 2138 of the IETF.

And the MAC address is defined as a user name or a calling station ID on the authentication protocol (RADIUS)

The authentication server 3 (RADIUS) authenticates the MAC address, and after this, transmits a challenge text by using a procedure equivalent to the CHAP defined at the RFC 1994 in the IETF (S16).

At the CHAP, a message digest MD 5 is defined as a hashing method being one way. However, instead of the MD 5, one of the other hashing methods can be used.

The AP 2, received the challenge text from the authentication server 3, returns the CHAP response (hashed challenge text) to the authentication server 3 by hashing by the CHAP (S17).

When the authentication server 3 recognizes that a normal response is received by the CHAP, the authentication server 3 notifies the AP 2 to the authentication completion as the total authentication is completed (S18).

The AP 2 received the information of the authentication completion notifies the authentication completion to the STA 1, and the STA 1 recognizes that the authentication is successful (S19).

After this, the STA 1 and the AP 2 go to the operation of association (S20).

When the authentication between the AP 2 and the authentication server 3 was successful, as mentioned at the first embodiment, the newly authenticated MAC address can be registered in the usable MAC address table stored in the AP 2. However, at the third embodiment, the open system authentication method is used and the security is low, therefore it is recommended that the newly authenticated MAC address is not newly registered.

After the association procedure is completed, the STA 1 executes communication by a normal IP (Internet protocol) packet through the AP 2.

Next a fourth embodiment of the present invention is explained. In case of the open system authentication method at the third embodiment, the communication period does not have a limit after the association, consequently, the possibility that an illegal connection is executed is high.

At the fourth embodiment of the present invention, an effective period of communication after the association is decided to a designated short period that is sufficient for that the shared key of the WEP algorithm is transported from a key control server (not shown) by using such an Internet Key Exchange method of Public Key Infrastructure. For example, this effective period of communication is recommended to be 10 seconds to one minute.

In FIG. 6, after the key is transported for the original shared key authentication method, de-association is executed (S21), and the connection is executed again by the shared key authentication method. As a result, even an illegal access used a false MAC address is executed, the security can be kept in high.

As mentioned above, at the present invention, the MAC address authentication, in which the shared key authentication method stipulated in the IEEE 802.11 is expanded, is executed. With this, at the wireless LAN system in which an illegal usage is liable to occur because of the usage of a wireless LAN card, the security can be kept in high. And the authentication for many wireless LAN cards can be executed from any of access points.

Moreover, at the present invention, a usable time limit of the shared key of the WEP is decided, and the period of the association at the open system authentication method is limited, consequently, the security can be kept in high.

Further, the MAC address table in the AP is automatically renewed by the instruction from the authentication server. Therefore, even the authentication server has some troubles, by utilizing the MAC address information until right before the troubles, the AP itself can authenticate the MAC address.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An authentication method for a wireless LAN (local area network) system, comprising:

transmitting an authentication request from a STA (terminal station) to an AP (access point), wherein said authentication request comprises a request from said STA to connect with said LAN;

requesting authentication of said authentication request from said AP to an authentication server, by converting said authentication request to a protocol adaptable to said authentication server;

if no problem occurs at hardware or software of said authentication server, checking said authentication request at said authentication server based on a MAC (media access control) address of said STA;

executing encryption authentication at said AP with said STA based on a designated encryption algorithm; and if no problem occurs at hardware or software of said authentication server, notifying an authentication completion from said authentication server to said AP, after said authentication server received a response of a completion of said encryption authentication from said AP, wherein said AP stores said MAC address said STA, and wherein, when a problem occurs in hardware or software of said authentication server said AP itself executes authentication of said STA based on said MAC address of said STA.

2. An authentication apparatus for a wireless LAN system comprising plural STAs; plural APs which connect to an authentication server and said plural STAs, and one of said plural APs receives an authentication request from one of said plural STAs and converts said authentication request from one of said plural STAs to a protocol adaptable to said authentication server, and authenticates said authentication request from one of said plural STAs based on a designated encryption algorithm; and said authentication server which, if no problem occurs at hardware or software of said authentication server, checks said authentication request from one of said STAs based on a MAC address of one of said plural STAs receiving said converted authentication request, and notifies an authentication completion to said AP, after said authentication server received a response of a completion of encryption authentication from said AP;

wherein said authentication request comprises a request from one of said plural STAs to connect with said LAN, wherein said AP stores a MAC address of said one of said STAs, and wherein in case that a problem occurs at hardware or software of said authentication server, said AP itself executes authentication of said one of said STAs based on said MAC address of said one of said STAs.

3. An access point apparatus comprising:

a first authentication part which executes an encrypted authentication of a terminal; and a second authentication part which executes a MAC address authentication of said terminal, using information about a MAC address, which is possessed by an authentication server, wherein said access point stores a MAC address of said terminal, and wherein when a failure occurs at hardware or software of said authentication server, said access point apparatus itself executes authentication of said terminal based on a MAC address of said terminal.

4. An access point apparatus comprising:

an authentication part which executes an encrypted authentication of a terminal;

a communication part which queries an authentication server about a MAC address of said terminal;
a connection control part which allows said terminal to connect with a network when a MAC address of said authentication server coincides with that of said terminal,
wherein said access point stores said MAC address of said terminal, and
wherein when a failure occurs at hardware or software of said authentication server, said access point apparatus itself executes authentication of said terminal based on said MAC address of said terminal.

5. An access point apparatus comprising:
a first authentication part which performs an encrypted authentication of a terminal using a WEP algorithm;
a second authentication part which performs a MAC address authentication of said terminal; and
a storing part which stores a MAC address of said terminal,
wherein when a connection request is issued from said terminal, said first authentication part and said second authentication part perform authentication, and said second authentication part also uses MAC address stored in an authentication server, and
wherein, when a failure occurs at hardware or software of said authentication server, said access point apparatus itself executes authentication of said terminal based on said MAC address of said terminal.

6. An access point apparatus in a wireless LAW system comprising:
a first authentication part which executes at least one of an encrypted authentication and an open system authentication of a terminal; and
a second authentication part which executes an authentication of said terminal using information of a MAC address of said terminal,
wherein said second authentication part also uses MAC address stored in an authentication server, which manages MAC addresses of terminals placed in one wireless LAN system, in executing an authentication of said terminal, and
wherein, when a failure occurs at hardware or software, of said authentication server, said access point apparatus itself executes authentication of said terminal based on said MAC address of said terminal.

7. A wireless LAN system comprising
a terminal
an access point apparatus; and
an authentication server,
wherein said terminal comprises a communication part which wirelessly communicates with said authentication server,
wherein said access point apparatus comprises a first authentication part which executes an encrypted authentication of said terminal and a second authentication part which executes a MAC address authentication of said terminal,
wherein said authentication server comprises a storing part which stores a MAC address of said terminal and a responding part which responds to an inquiry of said access point apparatus about a MAC address, and
wherein, when a failure occurs at hardware or software of said authentication server, said access point apparatus itself executes authentication of said terminal based on said MAC address of said terminal.

8. A wireless LAN system comprising
a terminal;
an access point apparatus; and
an authentication server,
wherein said terminal comprises a communication part which wirelessly communication with said access point apparatus,
wherein said access point apparatus performs an encrypted authentication of said terminal and performs a MAC address authentication of said terminal,
wherein said authentication server stores a MAC address of said terminal and supports the MAC address authentication with the stored MAC address, and
wherein, when a failure occurs at hardware or software of said authentication server, said access point apparatus itself executes authentication of said terminal based on said MAC address of said terminal.

9. A wireless LAN system comprising:
a terminal;
an access point apparatus; and
an authentication server,
wherein said terminal comprises a communication part which wirelessly communicates with said access point apparatus,
wherein said access point apparatus comprises an authentication part which performs a MAC authentication of said terminal,
wherein said authentication server, which is placed in one wireless LAN system, comprises a storing part which stores a MAC address of said terminal and a responding part which responds to an inquiry from said access point apparatus about MAC address, and
wherein, when a failure occurs at hardware or software of said authentication server, said access point apparatus itself executes authentication of said terminal based oil said MAC address of said terminal.

10. A method for authenticating a terminal in a wireless LAN system comprising:
performing, by an access point apparatus, an encrypted authentication of a terminal when an authentication request is issued from said terminal;
performing a MAC address authentication of said terminal with the MAC address information that an authentication server manages;
storing a MAC address of said terminal in said access point apparatus; and
when a failure occurs at hardware or software of said authentication server, executing authentication of said terminal based on said MAC address of said terminal by access point apparatus itself.

* * * * *